United States Patent
Haeupler et al.

(10) Patent No.: US 9,934,311 B2
(45) Date of Patent: Apr. 3, 2018

(54) GENERATING UNWEIGHTED SAMPLES FROM WEIGHTED FEATURES

(71) Applicant: Microsoft Technology Licensing, LLC, Redmond, WA (US)

(72) Inventors: Bernhard Haeupler, Moutain View, CA (US); Kunal Talwar, San Francisco, CA (US); Mark S. Manasse, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1015 days.

(21) Appl. No.: 14/260,712

(22) Filed: Apr. 24, 2014

(65) Prior Publication Data

US 2015/0310102 A1 Oct. 29, 2015

(51) Int. Cl.
*G06F 17/30* (2006.01)
(52) U.S. Cl.
CPC .............................. *G06F 17/30864* (2013.01)
(58) Field of Classification Search
None
See application file for complete search history.

(56) References Cited

U.S. PATENT DOCUMENTS

| | | | |
|---|---|---|---|
| 6,119,124 A | 9/2000 | Broder et al. | |
| 6,269,362 B1 | 7/2001 | Broder et al. | |
| 6,349,296 B1 | 2/2002 | Broder et al. | |
| 6,542,886 B1 | 4/2003 | Chaudhuri et al. | |
| 7,203,343 B2 | 4/2007 | Manasse et al. | |
| 7,610,283 B2 | 10/2009 | Arasu et al. | |
| 7,716,144 B2 | 5/2010 | McSherry et al. | |
| 8,103,686 B2 | 1/2012 | Gollapudi et al. | |
| 2003/0224344 A1 | 12/2003 | Shamir et al. | |
| 2008/0235201 A1 | 9/2008 | McSherry et al. | |
| 2008/0313128 A1* | 12/2008 | Arasu | G06F 17/30312 |
| 2009/0132571 A1 | 5/2009 | Manasse et al. | |
| 2009/0192960 A1 | 7/2009 | Charles et al. | |
| 2009/0300008 A1 | 12/2009 | Hangartner et al. | |
| 2010/0070511 A1 | 3/2010 | Manasse et al. | |
| 2012/0213313 A1 | 8/2012 | Manasse et al. | |
| 2013/0204905 A1 | 8/2013 | Ioffe | |

OTHER PUBLICATIONS

Bernhard Haeupler, Mark Manasse, Kunal Talwar, "Consistent Weight Sampling Made Fast, Small and Easy", Oct. 2014.*

(Continued)

*Primary Examiner* — Amresh Singh
(74) *Attorney, Agent, or Firm* — Workman Nydegger

(57) ABSTRACT

Weighted features associated with a document are scaled using scales to generate a set of unweighted elements for each scale. A sketch is generated for each scale by sampling the unweighted elements generated for the scale. The scales are chosen based on a selected cutoff factor so that documents that have a similarity that is less than the cutoff factor might have no scales in common, while documents that have a similarity that is greater than the cutoff factor will have at sufficiently many but at least one scale in common. The similarity of these documents can be estimated using the sketches associated with each of the documents for the common scales.

20 Claims, 6 Drawing Sheets

(56) References Cited

OTHER PUBLICATIONS

Naik, Azad, "Using Multi-Task Learning for Large-Scale Document Classification", Published on: May 3, 2013, Available at: http://digilib.gmu.edu/xmlui/bitstream/handle/1920/8479/Naik_thesis_2013.pdf?sequence=1.

Manasse, Mark, "On the Efficient Determination of Most near Neighbors: Horseshoes, Hand Grenades, Web Search and Other Situations When Close is Close Enough", In Book of Morgan & Claypool, Retrieved on: Feb. 17, 2014, 88 pages.

Li, et al., "One Permutation Hashing for Efficient Search and Learning", In arXiv preprint arXiv:1208.1259, Aug. 2012, 33 pages.

Ioffe, Sergey, "Improved Consistent Sampling, Weighted Minhash and L1 Sketching", In 10th IEEE International Conference on Data Mining, Dec. 14, 2010, 10 pages.

* cited by examiner

GENERATING UNWEIGHTED SAMPLES FROM WEIGHTED FEATURES

BACKGROUND

Large collections of documents typically include many documents that are identical or nearly identical to one another. Determining whether two digitally-encoded documents are bit-for-bit identical is straightforward, using hashing techniques for example. Quickly identifying documents that are roughly or effectively identical, however, is a more challenging and, in many contexts, a more useful task.

For example, the World Wide Web is an extremely large set of documents, and has grown exponentially since its birth. Indexed Web corpora currently include approximately five billion to 120 billion web pages, a significant portion (roughly a third, in most surveys) of which are duplicates and near-duplicates. Applications such as web crawlers and search engines benefit from the capacity to efficiently detect, and often suppress, many near-duplicates.

One method for determining duplicate or near-duplicate documents is by using sketches. A sketch is an approximation of a document that may be made up of samples of the document. The Jaccard, or the weighted Jaccard, similarity of two documents may be estimated by comparing the sketches of the documents position by position for equivalence. If the elements of the sketch are unbiased, or only slightly biased similarity estimators, each one matches the corresponding sketch element with probability related to the Jaccard value. While comparing documents using sketches is fast, current methods for generating accurate and reliable sketches are computationally expensive.

SUMMARY

A weighted document is one where each feature is associated with a weight. The weight contributes to the computation of a weighted Jaccard comparison between two weighted documents, where each feature contributes to the numerator of the Jaccard similarity fraction by the lesser of the two weights assigned to this feature in each document, and to the denominator by the greater of the weights. If the weights are chosen to be only zeroes, representing the absence of a feature in some document, and ones, representing presence, the weighted Jaccard value and unweighted Jaccard value are in agreement. Sketches may be produced independently for every document; to do so, the feature weights are scaled using one or more of a plurality of scales, each with an associated scale factor. The scaled elements are then randomly rounded to integers, and heavy elements replicated that integer number of times to generate a set of unweighted elements for each scale, with expected total count equal to the sum of the scaled weights, all this in a consistent manner. Consistency may be defined as: if (f, w) is a member of a sketch at a scale s for $W_a$ and $W_b \leq W_a$ at every point but $w \leq W_b(f)$, then (f, w) is also in the scale s sketch for $W_b$ if there is one.

An unweighted sketch is then generated for each scale by sampling the unweighted elements generated for the scale. The scales are chosen based on a selected cutoff factor so that documents that have a similarity that is less than the cutoff factor may have no scales in common, while documents that have a similarity that is greater than the cutoff factor will have at least a chosen number of scales in common. The similarity of documents with too few or no common scale is guaranteed to be below the cutoff value, while any common scale and the unweighted sketch associated with each of the documents for the common scale provides an estimator for the similarity of these documents.

In an implementation, a set of weighted features is received by a computing device. The set of weighted features is associated with a first document. Scales are determined for the set of weighted features by the computing device, often using the sum of the weights of all features, the desired number of samples for each scale, and a cutoff value. For each of the scales, an unweighted sketch is generated by the computing device. The generated sequence of unweighted sketches and the corresponding scales are associated with the first document by the computing device.

In an implementation, a first document is associated with a first plurality of unweighted sketches and a first plurality of scales is received or selected by a computing device. A second document associated with a second plurality of unweighted sketches, and a second plurality of scales is selected or received by the computing device. That there is not at least one scale in common between the first plurality of scales and the second plurality of scales is determined. In response, it is determined that the first document is not similar to the second document by an amount exceeding the cutoff value When two documents do share at least one common scale, the sketches for each common scale are compared to produce an estimate for the similarity of the first document and the second document.

This summary is provided to introduce a selection of concepts in a simplified form that are further described below in the detailed description. This summary is not intended to identify key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
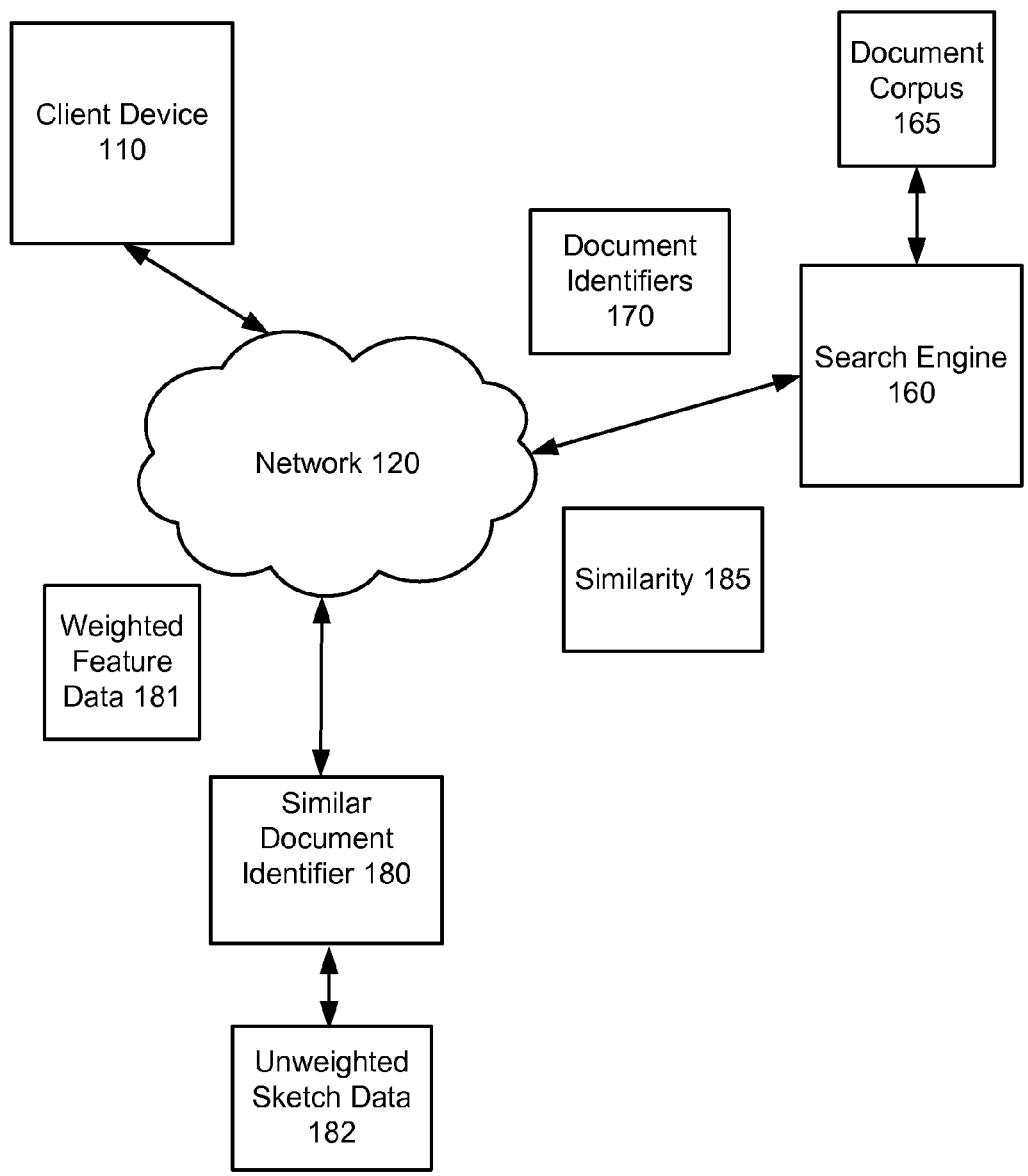
FIG. 1 is an illustration of an exemplary environment for generating sketches from weighted feature data, and for estimating the similarity of documents using the sketches.

FIG. 1 is an illustration of an exemplary environment 100 for generating sketches from weighted feature data, and for determining the similarity of documents using the unweighted sketches. A client device 110 may communicate with a search engine 160 through a network 120. The client device 110 may be configured to communicate with the search engine 160 to access, receive, retrieve, and display documents and other information such as web sites or web pages. The network 120 may be a variety of network types including the public switched telephone network (PSTN), a cellular telephone network, and a packet switched network (e.g., the Internet).

In some implementations, the client device 110 may include a desktop personal computer, workstation, laptop, personal digital assistant (PDA), smartphone, cell phone, or any WAP-enabled device or any other computing device capable of interfacing directly or indirectly with the network 120. The client device 110 may be implemented using one or more computing devices such as the computing device 600 illustrated in FIG. 6. The client device 110 may run an HTTP client, e.g., a browsing program, such as MICROSOFT INTERNET EXPLORER or other browser, or a WAP-enabled browser in the case of a cell phone, PDA, or other wireless device, or the like, allowing a user of the client device 110 to access, process, and view information and documents made available to it from the search engine 160.

The search engine 160 may be configured to provide data relevant to queries received from users using devices such as the client device 110. In some implementations, the search engine 160 may receive a query from a user and may fulfill the query using data stored in a document corpus 165. The document corpus 165 may comprise an index of URLs corresponding to documents along with text or key words associated with the documents.

The search engine 160 may fulfill a received query by searching the document corpus 165 for documents that are likely to be responsive the query. Identifiers of the responsive documents may be provided to the client device 110.

As may be appreciated, a large number of documents identified by the document corpus 165 may be duplicates or near-duplicates of one another. To avoid returning duplicate or near-duplicate documents in response to a query, the environment 100 may further include a similar document identifier 180. The similar document identifier 180 may receive document identifiers 170 that identify a first and a second document and may estimate the similarity 185 of the first and the second documents. In an implementation, the estimated similarity 185 may be the Jaccard similarity, and may be provided to the search engine 160. The search engine 160 may use the similarity 185 to determine whether the first and the second documents are duplicates or near-duplicates of one another.

Figure 2:
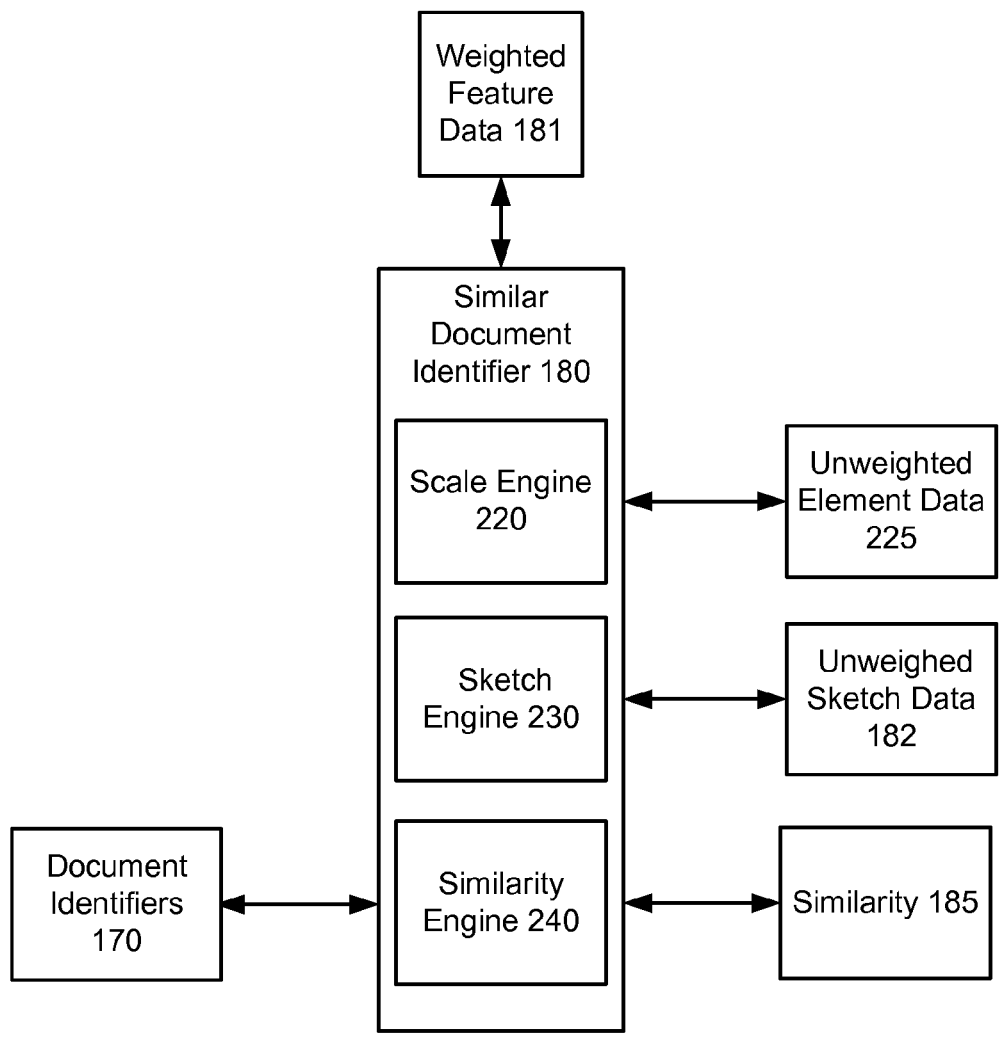
FIG. 2 shows a block diagram of an implementation of a similar document identifier.

As described further with respect to FIG. 2, the similar document identifier 180 may estimate the similarity 185 of pairs of documents using unweighted sketch data 182 associated with each of the documents. The unweighted sketch data 182 for a document may include a plurality of unweighted sketches, with each sketch generated from weighted feature data 181 associated with the document using a scale selected from a plurality of scales.

FIG. 2 shows a block diagram of an implementation of a similar document identifier 180. As illustrated, the similar document identifier 180 includes one or more components including a scale engine 220, a sketch engine 230, and a similarity engine 240. More or fewer components may be supported. Some or all of the components of the similar document identifier 180 may be implemented by the same or different computing devices such as the computing device 600.

The similar document identifier 180 may receive weighted feature data 181 for a plurality of documents. The documents may be part of the document corpus 165 of the search engine 160, or may be associated with a different source. In some implementations, the documents may include a variety of documents types such as images, text files, html documents, web pages, and videos. Other types of documents may be supported.

In some implementations, the weighted feature data 181 associated with a document may be a weighted sketch. The weighted feature data 181 may include a plurality of features and each feature may have an associated weight. As described further herein, the similar document identifier 180 may take weighted features associated with a document and may generate unweighted sketch data 182 from the weighted features. The unweighted sketch data 182 may include one or more weight-labeled samples and indicators of one or more scales. The unweighted sketch data 182 associated with two documents may allow for the similarity between the two documents to be estimated more efficiently than when determining exact similarity using weighted features.

One measure of similarity between two documents is known as the Jaccard similarity. Documents with a high Jaccard similarity may be duplicates or near-duplicates, while documents with a low Jaccard similarity are unlikely to be near-duplicates. Determining the similarity between documents is useful for purposes of document de-duplication, therefore, in some implementations, determining the exact Jaccard similarity between two documents may not be necessary where the similarity is known to be low.

Accordingly, in some implementations, the similar document identifier 180 may use what is referred to herein as a cutoff factor $\alpha$ when estimating the Jaccard similarity. When comparing sketches of two documents with a Jaccard similarity that is greater than $\alpha$, the document identifier 180 may output a similarity 185 that includes a highly precise similarity estimate. When comparing sketches of two documents with a Jaccard similarity that is less than $\alpha$, the similar document identifier 180 may output a less precise similarity estimate or a similarity 185 that is an indicator only that the Jaccard similarity is guaranteed to be less than $\alpha$. In some implementations, $\alpha$ may have a value of 0.5, however, other values may be used.

The scale engine 220 may determine a plurality of scales to use for generating unweighted elements from the weighted feature data 181 associated with a document. The scale engine 220 may generate a set of unweighted elements for each scale, by multiplying the weights associated with the features of the weighted feature data 181 by the scale. The scaled weights may be stored by the scale engine 220 as the unweighted element data 225, after conversion to multiple unit weight fragments.

Depending on the implementation, the scale engine 220 may scale each of the features from the weighted feature data 181, or may only select some subset of the features as the elements. The unweighted element data 225 may be assigned to k sample slots, from each of which one element may be selected as an element of the unweighted sketch data 182. The minimal expected number of elements from the unweighted element data 225 that will compete for each sample spot in the unweighted sketch data 182 referred to herein as L. Depending on the implementation, the value of k may be 256 and the value of L may be 12. Other values may be used. In some implementations, the particular values selected may depend on the type of hashing that may be used to generate the unweighted sketch data 182 and the precision and/or accuracy that is sought.

In some implementations, the scale engine 220 may select the scales for the plurality of scales such that each scale is a, not necessarily integral, power of α. The total number of scales in the plurality of scales is referred to herein as t. The number of desired common scales for documents whose L1 norms differ by at most the cut-off factor α is another parameter t' that is chosen. Note that t' should be between 1 and t−1. For example, suppose that t=2 and t'=1, then use scaling factors that are integer powers of 1/α. Let p be the smallest integer such that $1/\alpha^p$ times the L1 weight of the document is at least Lk. Then choose as the scaling factors $1/\alpha^p$ and $1/\alpha^{p+1}$, and multiply all weights of the features by the scaling factor. In this case, given two documents whose L1 norms differ by a ratio of at most α the norms of these two items either lie in the same range (i.e., in $[\alpha^{-k}, \alpha^{-(k+1)})$ for $k=\lfloor \log_{1/\alpha} W_1 \rfloor = \lfloor \log_{1/\alpha} W_2 \rfloor$) or in adjacent ranges (e.g., $W_1 \in [\alpha^{-k}, \alpha^{-(k+1)})$ and $W_2 \in [\alpha^{-(k+1)}, \alpha^{-(k+2)})$). It is then straightforward to see that they will share at least one scaling factor. For other choices of t' and t a different set of scaling factors will be required.

In some implementations, the scaling engine may use as scaling factors integral powers of $$\beta = \alpha^{-\frac{1}{t-t'}}.$$

Let p be the smallest integer such that $\beta^p$ times the L1 weight of the document is at least Lk. The first scaling factor is chosen to be $\beta^p$ and the other scaling factors are $\beta^{p+1}$, $\beta^{p+2}$, ..., $\beta^{p+t-1}$. For example, where the total number of selected elements k=128, L=5, t=4, t'=2 and cut-off factor α=½, β may be chosen as $\sqrt{2}$. For example for the first scale, the scaling engine 220 may scale the weights of the features from the weighted sketch data 181 so their sum lies in the range of [640, 905). These elements may be stored in the unweighted element data 225 and may be associated with the first scale of the plurality of scales. For the second scale, the scale engine 220 may scale the weights of the features by a factor of $\sqrt{2}$ to sum to a norm in the range of [905, 1280), and may associate the elements with the second scale in the plurality of scales in the unweighted element data 225. Similarly, for the third and fourth scale, the scale engine 220 may scale the weights of the features by another factor or another two factors of $\sqrt{2}$ to a sum in the range of [1280; 1810) and [1810; 2560), and may associate the elements with the third and fourth scale in the plurality of scales in the unweighted element data 225.

Some of the generated elements in the unweighted element data 225 may include fractional parts. Depending on the implementation, the scale engine 220 may eliminate the fractional parts using a consistent randomized rounding scheme. Other methods for eliminating fractional parts or elements may be used. In randomized rounding, for example, when generating the unweighted element data 225, an element from the weighted feature data 181 with an integer part $j=\lfloor W \rfloor$ and a fractional part $f=W-j \in [0, 1)$ may become j unit weight elements with a probability of 1−f and j+1 unit weight elements with a probability of f. In some implementations, this rounding may be done by selecting for each feature a random number r between 0 and 1, and rounding W as above to j if r is larger than w−j and to j+1 otherwise. The same r may be used for this feature, for every weighted document containing it. In some implementations, this r may be generated by computing a pseudorandom hash value indexed by the name of the feature.

The sketch engine 230 may generate an unweighted sketch by sampling the elements of the unweighted element data 225 generated for each scale by the scale engine 220. The sketch engine may 230 may generate an unweighted sketch using any method, system, or technique for generating unweighted sketches.

In some implementations, the sketch engine 230 may generate a sketch for a scale by assigning each unit weight element of the unweighted element data 225 for the scale to one bin of a plurality of bins in a consistent manner. The total number of bins may correspond to the total number of elements sought for the generated sketch or k. The sketch engine 230 may assign each element to a bin using a hash function, for example. Other methods may be used.

Depending on the implementation, each bin may have been assigned, in expectation, between L and L/α number of elements for the first scale of the plurality of scales, between L/α and L/(α^2) number of elements for the second scale of the plurality of scales. Accordingly, the sketch engine 230 assigning no elements to a bin is unlikely.

However, in the event that a bin is empty and was assigned no sample, the sketch engine 230 may assign the bin a default value such as zero. Other values may be used. By assigning empty bins a value of zero, the unweighted sketches may be stored more compactly as the unweighted sketch data 182 because no additional storage space is needed to indicate that a bin was empty. Alternatively, one or more bytes, or other data structures, may be used to indicate the position of any empty bins in the unweighted sketch data 182.

The sketch engine 230 may consistently select or sample one element from each of the bins for the sketch associated with the scale. Depending on the implementation, the sketch engine 230 may assign a pseudo-random hash value to each element in a bin, and may select the element from the bin having the lowest value for the sketch. Other methods for consistently sampling elements for a sketch may be used.

The sketch engine 230 may, for each document, associate the generated sketch for each scale of the plurality of scales with the document as the unweighted sketch data 182. In addition, the sketch engine 230 may further associate the scales used to generate the sketches with the document. An identifier of each document and the associated sketches and scales may be stored by the sketch engine 230 as the unweighted sketch data 182.

The similarity engine 240 may use the unweighted sketch data 182 to estimate or determine the similarity 185 of two documents. The similarity engine 240 may receive document identifiers 170 that identify a first document and second document. The document identifiers 170 may be received from a search engine 160, and may identify or include documents from the document corpus 165, for example.

In some implementations, the similarity engine 240 may calculate or determine the similarity between a first and a second document identified by the document identifiers 170 by retrieving the unweighted sketch data 182 associated with the first document and the second document. As described above, the unweighted sketch data 182 for a document includes a plurality of scales and an unweighted sketch for each scale of the plurality of scales. As a first stage, the similarity engine 240 may determine whether the plurality of scales associated with the first document and the second document have at least one scale in common. If there is no scale in common between the first document and the second document, then the estimated Jaccard similarity between the first document and the second document cannot be greater than α (i.e., the cutoff factor) or a smaller similarity.

As described above, the similarity of two documents is useful for determining whether or not the documents are duplicates or near-duplicates. Merely knowing that the similarity of two documents is below the cutoff factor is sufficient to make such a determination. Accordingly, when the unweighted sketch data 182 associated with two documents have no scales in common, the generated similarity 185 should indicate that the similarity is below α.

Where the first and second documents have at least one scale in common, the similarity engine 240 may use the sketches from the unweighted sketch data 182 associated with the documents to calculate or estimate the Jaccard similarity of the two documents. In some implementations, the similarity engine 240 may calculate or determine the similarity using only the sketches from the unweighted sketch data 182 associated with the matching scales. Thus, for example, if the first scale through the third scale of both the first document and the second document are matches, then the similarity engine 240 may use one or more (or, in this example, as many as all three) of the unweighted sketches generated by the sketch engine 230 for the first scale through the third scale to estimate the Jaccard similarity. Depending on the implementation, some or all of the sketches associated with matching scales may be used to calculate the similarity, or only one sketch may be used. Where multiple sketches are used, the calculated Jaccard similarities for each sketch may be averaged or combined. Any method for calculating, determining, or estimating a Jaccard similarity of two documents from unweighted sketches may be used.

Figure 3:
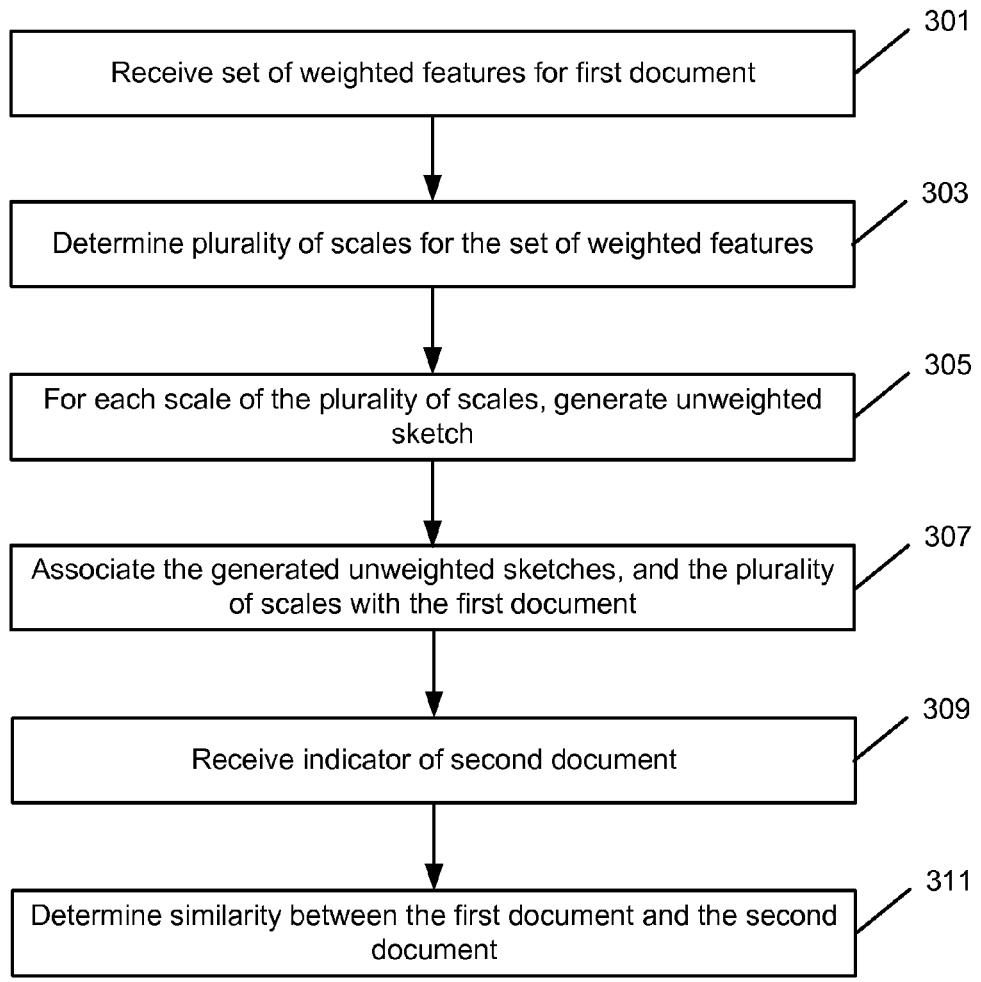
FIG. 3 is an operational flow of an implementation of a method for generating unweighted element data from weighted feature data associated with a first document, and estimating a similarity between a first document and a second document using the unweighted element data.

FIG. 3 is an operational flow of an implementation of a method 300 for generating unweighted element data from weighted feature data associated with a first document, and determining a similarity between a first document and a second document using the unweighted element data. The method 300 may be implemented by the similar document identifier 180, for example.

A set of weighted features for a first document is received at 301. The set of weighted features may be the weighted feature data 181 and may be received by the similar document identifier 180 from the search engine 160, or other document provider. The first document may be an image document, text document, video document, or other type of document.

A plurality of scales is determined for the set of weighted features at 303. The plurality of scales may be determined by the scale engine 220. The number of scales in the plurality of scales may be three, for example. In some implementations, each scale may be based on a cutoff factor α where documents with Jaccard similarities that are less than the cutoff factor are assumed to be dissimilar enough that estimating the similarity is unnecessary. In some implementations, each scale may be a power of α. In another implementation, each scale may be selected such that the scale is a factor of two, three or, four greater than a previous scale in the set of scales. Other non-integral powers and/or factors may be used. A non-multiplicative relationship may hold between the ranges of scales, and any set of intervals spanning the full range of possible weight values from zero to infinity may be used. Multiplicatively related intervals may be convenient to simplify the mapping from incoming weights to intervals, but this convenience is not a requirement.

For each scale of the plurality of scales, an unweighted sketch is generated at 305. Each unweighted sketch may be generated by the sketch engine 230. In some implementations, the sketch engine 230 may generate a plurality of unweighted elements from the plurality of weighted features associated with the document by multiplying each weighted feature by the scale. The unweighted elements may be sampled by the sketch engine 230 to generate an unweighted sketch for the scale using any one of a variety of methods for generating an unweighted sketch. An example method for generating unweighted sketches is described further with respect to FIG. 5. In some implementations, other methods may be used.

The generated unweighted sketches and the plurality of scales are associated with the first document at 307. The generated unweighted sketches and the plurality of scales may be associated with the first document by the sketch engine 230 as the unweighted sketch data 182.

An indicator of a second document is received at 309. The indicator of the second document may be received by the similarity engine 240. The indicator of the second document may be received from the search engine 160 and may be part of a request to determine a similarity between the second document and the first document. Like the first document, the similar document identifier 180 may have generated unweighted sketch data 182 based on weighted feature data 181 associated with the second document.

A similarity 185 between the first document and the second document is determined at 311. The similarity between the first document and the second document may be determined or estimated by the similarity engine 240 using the unweighted sketch data 182 associated with the first document and the second document. The similarity 185 may be an estimated Jaccard similarity and may be determined or calculated using those unweighted sketches associated with the first document and the second document that were generated using the same scale. The determined similarity may then be used by the search engine 160 to determine whether or not the first and second documents are duplicates or near-duplicates. A method of determining, calculating, or estimating the Jaccard similarity using unweighted sketch data 182 is described further with respect to FIG. 4.

Figure 4:
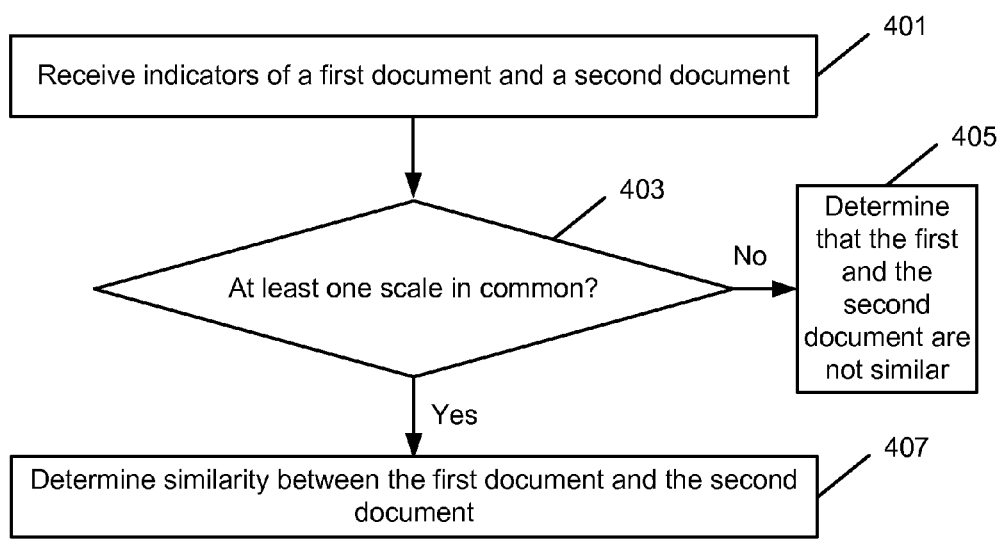
FIG. 4 is an operational flow of an implementation of a method for determining a similarity between a first document and a second document using unweighted sketch data.

FIG. 4 is an operational flow of an implementation of a method 400 for determining a similarity between a first document and a second document using unweighted sketch data. The method 400 may be implemented by the similar document identifier 180, for example.

Indicators of a first document and a second document are received at 401. The indicators of the first document and the second document may be the document identifiers 170 and may be received by the similarity engine 240, in an implementation.

A determination is made as to whether the first document and the second documents have at least one scale in common at 403. The determination may be made by the similarity engine 240 using the unweighted sketch data 182 associated with each of the first and the second document. As described above, the unweighted sketch data 182 for each document may include unweighted sketches, and each unweighted sketch may have been generated from a scale of a plurality scales. If none of the unweighted sketches associated with the first document were generated using a same scale as any of the unweighted sketches associated with the second document, the first and second documents may have no scales in common. If the first and the second documents have at least one scale in common, then the method 400 may continue at 407. Otherwise, the method 400 may continue at 405.

A determination is made that the first document and the second documents are not similar at 405. The determination may be made by the similarity engine 240. Because the first document and second document have no scales in common, they cannot have a Jaccard similarity that is greater than the cutoff factor. Because the cutoff factor is chosen such that any documents having a similarity that is below the cutoff factor are uninteresting or dissimilar, the similarity engine 240 may return a similarity 185 that indicates that the similarity is below the cutoff factor rather than estimating the actual Jaccard similarity.

The similarity of the first document and the second document are calculated or otherwise determined at 407. The similarity may be the similarity 185 and may be calculated or determined by the similarity engine 240 from some or all of the unweighted sketches associated with scales that are associated with both the first document and the second document. Any method for calculating or determining the similarity of documents based on unweighted sketches may be used.

Figure 5:
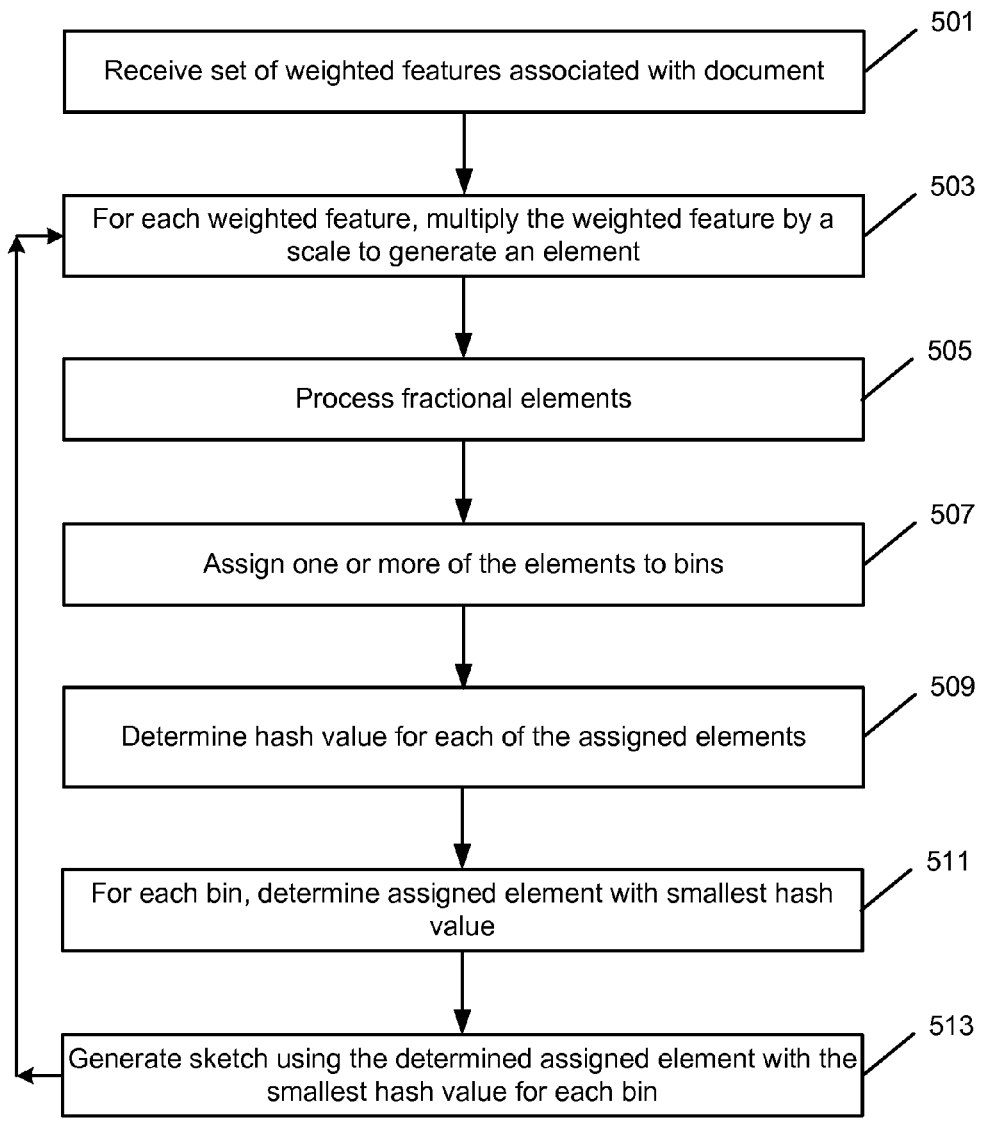
FIG. 5 is an operational flow of an implementation of a method for generating unweighted sketch data from weighted features.

FIG. 5 is an operational flow of an implementation of a method 500 for generating unweighted sketch data from weighted features. The method 500 may be implemented by the similar document identifier 180, for example.

A set of weighted features associated with a document is received at 501. The set of weighted features may be the weighted feature data 181 and may be received by the similar document identifier 180.

For each weighted feature, the weighted feature is multiplied by a scale to generate elements at 503. The weighted features may be multiplied by the scale engine 220 to generate unweighted element data 182. The scale may be a non-integral power of $\alpha$, although other factors may be used.

Fractional scaled elements are processed at 505. The fractional elements may be processed by the scale engine 220 using randomized rounding. Other methods may be used.

One or more of the elements are assigned to bins at 507. The one or more elements may be assigned to a bin of a plurality of bins by the sketch engine 230. Depending on the implementation, there may be a bin corresponding to each element that will be part of the unweighted sketch that is generated from the unweighted element data. The sketch engine 230 may select samples for each bin using a hash function, for example.

A hash value is determined for each of the assigned elements at 509. The hash value may be determined using a pseudo-random hash function by the sketch engine 230, in an implementation. For each bin, an assigned element with the smallest hash value is determined at 511. The assigned element with the smallest hash value may be determined by the sketch engine 230. Alternatively, the element with the largest hash value may be determined. Any technique which would uniquely identify some value as the most desirable may be used. For example, the value closest to but not exceeding one-half if any, or the smallest value exceeding one-half would be an equally valid method for choosing among the hash values.

An unweighted sketch is generated using the determined assigned element with the smallest hash value for each bin at 513. The unweighted sketch may be generated by the sketch engine 230. The unweighted sketch may be associated with the scale used to generate the unweighted sample data 225 and the document associated with the weighted feature data 181. After generating the unweighted sketch, the method 500 may return to 503 to generate an unweighted sketch for a next scale in the plurality of scales.

Figure 6:
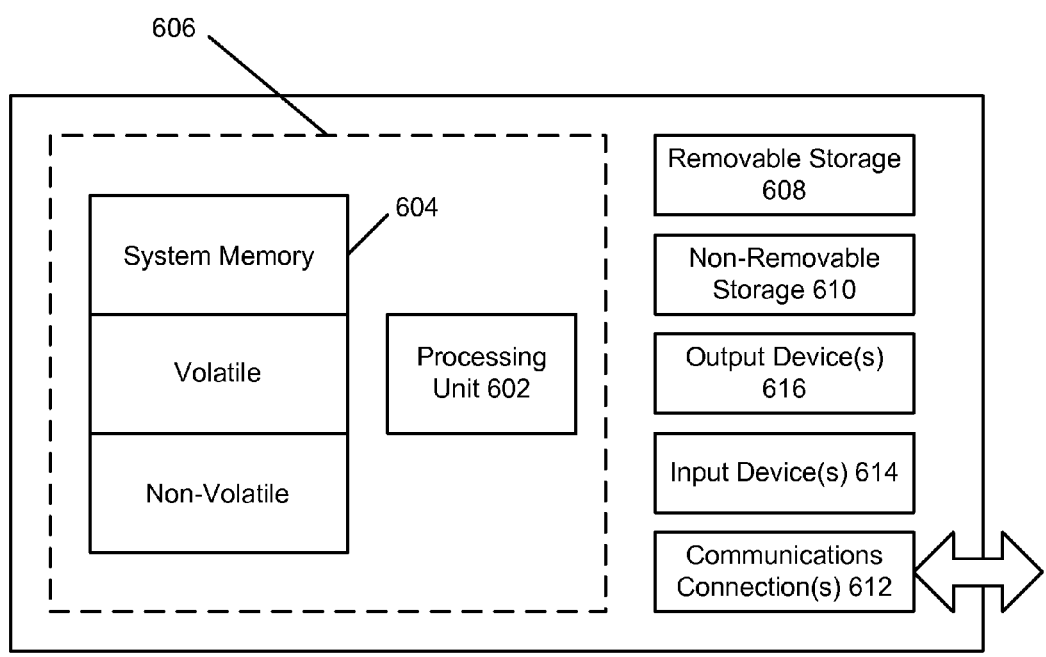
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method comprising:
   receiving a set of weighted features by a computing device, wherein the set of weighted features is associated with a first document of a plurality of documents;
   determining a plurality of scales for the set of weighted features by the computing device;
   generating an unweighted sketch for each of the scales by performing the following:
     multiplying each of the weighted features by each of the scales to generate a plurality of elements;
     assigning the plurality of elements to a plurality of bins;
     determining a pseudo-random hash value for each of the assigned elements;
     for each of the bins, determining which assigned element has a smallest pseudo-random hash value; and
     generating the unweighted sketch for each of the scales using the determined assigned element for each of the bins;
   associating the generated unweighted sketches and the plurality of scales with the first document by the computing device;
   receiving an indicator of a second document of the plurality of documents by the computing device, wherein the second document is associated with a second plurality of unweighted sketches and a second plurality of scales;
   determining a similarity between the first document and the second document using the plurality of unweighted sketches and the plurality of scales associated with the first document and the second plurality of unweighted sketches and the plurality of scales associated with the second document by the computing device, wherein determining the similarity comprises:
     determining that there is not at least one scale in common between the plurality of scales associated with the first document and the second plurality of scales associated with the second document; and
     in response, determining the similarity as being less than a cutoff similarity; and
   performing document de-duplication on the plurality of documents based on the determined similarity of the first document and the second document by the computing device.

2. The method claim 1, where each scale of the second plurality of scales associated with the second document is a multiplicative factor above a previous scale in the second plurality of scales associated with the second document.

3. The method of claim 1, wherein the scales of the second plurality of scales associated with the second document are selected based on a Jaccard similarity cutoff factor.

4. The method of claim 1, wherein the document is one or more of a webpage, an image document, a text document, video document, or an object.

5. The method of claim 1, wherein the similarity is a Jaccard similarity.

6. The method of claim 1, further comprising eliminating any fractional weighted features from the elements using consistent randomized rounding.

7. The method of claim 1, further comprising sampling the elements and generating the unweighted sketches from the sampled elements.

8. The method of claim 1, wherein at least one bin is assigned a default value.

9. The method of claim 8, wherein the default value is 0.

10. The method of claim 1, wherein a total number of bins corresponds to a total number of elements.

11. The method of claim 1, wherein each weighted feature in the set of weighted features is assigned a numeric value.

12. The method of claim 11, wherein the number value is selected from a group of numeric values consisting of a value of zero and a value of one, whereby the zero-numeric value indicates that a first type of feature is absent in the first document and the one-numeric value indicates that the first type of feature is present in the first document.

13. A method, implemented by one or more processors of a computer system, the method comprising:
   receiving a first document of a plurality of documents, the first document having associated therewith (1) a first plurality of unweighted sketches and (2) a first plurality of scales;
   receiving a second document of the plurality of documents, the second document having associated therewith (1) a second plurality of unweighted sketches and (2) a second plurality of scales, wherein the first plurality of unweighted sketches and the second plurality of unweighted sketches are generated by:
     multiplying weighted features of the first document and weighted features of the second document by each of the scales in the first plurality of scales and each of the scales in the second plurality of scales, respectively, to generate a plurality of elements;
     assigning the plurality of elements to a plurality of bins;
     determining a pseudo-random hash value for each of the assigned elements;

for each of the bins, determining which assigned element has a smallest pseudo-random hash value; and generating the first plurality of unweighted sketches and the second plurality of unweighted sketches using the determined assigned element for each of the bins;

determining a similarity between the first document and the second document using the first plurality of unweighted sketches and the second plurality of unweighted sketches, wherein determining the similarity comprises:

determining that there is not at least one scale in common between the first plurality of scales associated with the first document and the second plurality of scales associated with the second document; and in response, determining the similarity as being less than a cutoff similarity; and performing document de-duplication on the plurality of documents based on the determined similarity of the first document and the second document.

14. The method of claim 13, wherein the similarity is the Jaccard similarity.

15. A system comprising:

at least one computing device; and a similar document identifier configured to:

receive a plurality of documents, wherein each document is associated with weighted features;

for each document:

determine a plurality of scales for the weighted features associated with the document;

generate an unweighted sketch for each of the scales from the weighted features associated with the document by:

multiplying each of the weighted features by each of the scales to generate a plurality of elements;

assigning the plurality of elements to a plurality of bins;

determining a pseudo-random hash value for each of the assigned elements;

for each of the bins, determining which assigned element has a smallest pseudo-random hash value; and generating the unweighted sketch for each of the scales using the determined assigned element for each of the bins; and associate the generated unweighted sketches and the plurality of scales with each corresponding document;

receive an indicator of a first document and a second document from the plurality of documents;

calculate a similarity of the first document and the second document using the generated unweighted sketches and the plurality of scales associated with each of the first document and the second document, wherein determining the similarity comprises:

determining that there is not at least one scale in common between a first plurality of scales associated with the first document and a second plurality of scales associated with the second document; and in response, determining the similarity as being less than a cutoff similarity; and perform document de-duplication on the plurality of documents based on the calculated similarity of the first document and the second document.

16. The system of claim 15, wherein the similarity is a Jaccard similarity.

17. The system of claim 15, wherein determining the similarity comprises:

determining that there is at least one scale in common between the plurality of scales associated with the first document and the second plurality of scales associated with the second document; and in response, calculating the similarity using the plurality of unweighted sketches associated with the first document and the second plurality of unweighted sketches associated with the second document.

18. A method that is implemented by one or more processors of a computer system, the method comprising:

receiving a set of weighted features, the set of weighted features being associated with a first document included among a plurality of documents;

determining a plurality of scales for the set of weighted features;

generating an unweighted sketch for each of the scales by:

multiplying each of the weighted features by each of the scales to generate a plurality of elements;

assigning the plurality of elements to a plurality of bins;

determining a pseudo-random hash value for each of the assigned elements;

for each of the bins, determining which assigned element has a smallest pseudo-random hash value; and generating the unweighted sketch for each of the scales using the determined assigned element for each of the bins;

associating the generated unweighted sketches and the plurality of scales with the first document;

receiving an indicator of a second document that is also included among the plurality of documents, the second document having associated therewith a second plurality of unweighted sketches and a second plurality of scales;

determining a similarity between the first document and the second document using the plurality of unweighted sketches and the plurality of scales associated with the first document and the second plurality of unweighted sketches and the second plurality of scales associated with the second document by performing the following:

determining that there is at least one scale in common between the plurality of scales associated with the first document and the second plurality of scales associated with the second document; and in response, determining the similarity using (1) one or more sketches from the plurality of unweighted sketches associated with the first document and the at least one common scale and (2) one or more sketches from the plurality of unweighted sketches associated with the second document and the at least one common scale; and performing document de-duplication on the plurality of documents based on the determined similarity of the first document and the second document.

19. The method of claim 1, wherein the unweighted sketches associated with the first document comprise approximations of the first document.

20. The method of claim 19, wherein the approximations are based on one or more samples of the first document.

* * * * *